US009114885B2

(12) United States Patent
Calandra et al.

(10) Patent No.: US 9,114,885 B2
(45) Date of Patent: Aug. 25, 2015

(54) AIRCRAFT ENGINE CONTROL DURING ICING OF TEMPERATURE PROBE

(71) Applicant: Pratt & Whitney Canada Corp., Longueuil (CA)

(72) Inventors: Salvatore Calandra, Montreal (CA); Frederic Giroux, St. Jean sur Richelieu (CA); Mark Iacobacci, Lasalle (CA); Martin Chabot, Lachine (CA); Simon Hartropp, Pointe Claire (CA); Yusuf Syed, Oakville (CA); Dariusz Chmiel, Pierrefonds (CA); Adrienne Bajaj, Candiac (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 0 days.

(21) Appl. No.: 14/025,995

(22) Filed: Sep. 13, 2013

(65) Prior Publication Data

US 2014/0012481 A1    Jan. 9, 2014

Related U.S. Application Data

(63) Continuation of application No. 13/190,549, filed on Jul. 26, 2011, now Pat. No. 8,560,203.

(60) Provisional application No. 61/369,108, filed on Jul. 30, 2010.

(51) Int. Cl.
*B64D 31/06* (2006.01)
*F01D 25/02* (2006.01)
(Continued)

(52) U.S. Cl.
CPC ............... *B64D 31/06* (2013.01); *F01D 25/02* (2013.01); *F02C 7/047* (2013.01); *F02C 9/28* (2013.01);
(Continued)

(58) Field of Classification Search
CPC ............... F02C 9/28; F02C 9/00; G07C 3/00; F05B 2260/80; F05B 2270/303
USPC ................... 701/3, 8, 10, 14, 100; 244/134 R
See application file for complete search history.

(56) References Cited

U.S. PATENT DOCUMENTS 2,221,547 A * 11/1940 Kollsman ................... 73/861.68
2,469,375 A * 5/1949 Flagle ............................. 415/47
(Continued)

FOREIGN PATENT DOCUMENTS

EP      1204012 A1    5/2002
GB      2406394 A     3/2005

OTHER PUBLICATIONS

United States Patent Office; Office Action dated Jan. 16, 2013 re: U.S. Appl. No. 13/190,549.
(Continued)

*Primary Examiner* — James Trammell
*Assistant Examiner* — James E Stroud
(74) *Attorney, Agent, or Firm* — Norton Rose Fulbright Canada LLP

(57) ABSTRACT

Methods for controlling an aircraft turbofan engine during icing of a temperature probe and devices for carrying out such methods are described. The methods may comprise: using one or more signals representative of temperature received from a heated temperature probe to generate one or more control signals for use in controlling the engine; determining that an icing condition associated with the probe exists; and using data representing one or more substitute signals in place of signals representative of temperature received from the heated temperature probe to generate the one or more control signals for use in controlling the engine.

16 Claims, 6 Drawing Sheets

(51) Int. Cl.
*F02C 7/047* (2006.01)
*F02C 9/28* (2006.01)
*F02D 9/00* (2006.01)
*G07C 3/00* (2006.01)
*G01K 13/02* (2006.01)

(52) U.S. Cl.
CPC ............... *F02D 9/00* (2013.01); *G01K 13/022* (2013.01); *G07C 3/00* (2013.01); *F05B 2260/80* (2013.01); *F05B 2270/303* (2013.01); *F05D 2270/094* (2013.01); *F05D 2270/303* (2013.01); *F05D 2270/80* (2013.01)

(56) References Cited

U.S. PATENT DOCUMENTS

| | | | | |
|---|---|---|---|---|
| 2,970,475 | A * | 2/1961 | Werner | 374/138 |
| 3,694,102 | A * | 9/1972 | Conrad | 415/115 |
| 3,796,854 | A * | 3/1974 | Bennett et al. | 219/201 |
| 4,006,590 | A * | 2/1977 | Itoh | 60/39.281 |
| 4,159,625 | A * | 7/1979 | Kerr | 60/204 |
| 4,228,650 | A * | 10/1980 | Camp | 60/39.091 |
| 4,249,238 | A * | 2/1981 | Spang et al. | 701/100 |
| 4,414,807 | A * | 11/1983 | Kerr | 60/204 |
| 4,580,406 | A * | 4/1986 | Nims | 62/87 |
| 4,741,499 | A * | 5/1988 | Rudolph et al. | 244/134 B |
| 4,748,804 | A * | 6/1988 | Krukoski | 60/773 |
| 4,783,026 | A * | 11/1988 | Rumford et al. | 244/134 R |
| 5,570,300 | A * | 10/1996 | Henry et al. | 702/45 |
| 5,628,565 | A * | 5/1997 | Hagen et al. | 374/143 |
| 5,680,409 | A * | 10/1997 | Qin et al. | 714/799 |
| 6,027,075 | A * | 2/2000 | Petrenko | 244/134 R |
| 6,237,874 | B1 * | 5/2001 | Rutherford et al. | 244/134 E |
| 6,393,355 | B1 * | 5/2002 | Muramatsu | 701/100 |
| 6,398,407 | B2 * | 6/2002 | Hashimoto | 374/144 |
| 6,414,282 | B1 * | 7/2002 | Ice et al. | 219/481 |
| 6,421,625 | B1 * | 7/2002 | Cianciara et al. | 702/130 |
| 6,609,825 | B2 * | 8/2003 | Ice et al. | 374/138 |
| 6,804,600 | B1 * | 10/2004 | Uluyol et al. | 701/100 |
| 6,990,797 | B2 * | 1/2006 | Venkataramani et al. | 60/204 |
| 7,014,357 | B2 * | 3/2006 | Severson | 374/16 |
| 7,175,136 | B2 * | 2/2007 | Shah et al. | 244/134 R |
| 7,509,810 | B2 * | 3/2009 | Smith et al. | 60/772 |
| 7,628,359 | B2 * | 12/2009 | Shah et al. | 244/134 R |
| 7,883,609 | B2 * | 2/2011 | Petrenko et al. | 204/242 |
| 7,923,668 | B2 * | 4/2011 | Layland et al. | 219/535 |
| 8,011,172 | B2 * | 9/2011 | Lockwood | 60/39.093 |
| 8,206,079 | B2 * | 6/2012 | Bagnall et al. | 415/11 |
| 8,366,047 | B2 * | 2/2013 | Euvino et al. | 244/134 D |
| 8,560,203 | B2 * | 10/2013 | Calandra et al. | 701/100 |
| 8,602,359 | B2 * | 12/2013 | Stothers | 244/134 D |
| 2005/0066658 | A1 * | 3/2005 | Longnecker et al. | 60/602 |
| 2007/0278349 | A1 * | 12/2007 | Bembridge et al. | 244/134 R |
| 2009/0259362 | A1 * | 10/2009 | Veittinger | 701/35 |
| 2011/0277443 | A1 * | 11/2011 | Pereira et al. | 60/39.093 |
| 2012/0029786 | A1 * | 2/2012 | Calandra et al. | 701/100 |
| 2012/0065826 | A1 * | 3/2012 | Kinoshita et al. | 701/22 |

OTHER PUBLICATIONS

United States Patent Office; Response dated Apr. 15, 2013 to Office Action dated Jan. 16, 2013 re: U.S. Appl. No. 13/190,549.
United States Patent Office; Communication: Examiner-Initiated Interview Summary dated May 23, 2013 re: U.S. Appl. No. 13/190,549.
United States Patent Office; Voluntary Amendment and Summary of Interview dated May 15, 2013 to Communication: Examiner-Initiated Interview Summary dated May 23, 2013 re: U.S. Appl. No. 13/190,549.
Extended European Search Report dated Jan. 15, 2015 re: Application No. 11176212.6.

\* cited by examiner

AIRCRAFT ENGINE CONTROL DURING ICING OF TEMPERATURE PROBE

TECHNICAL FIELD

The disclosure relates generally to the control of aircraft engines, and more particularly to controlling an aircraft turbine engine during an icing condition of a temperature probe.

BACKGROUND OF THE ART

An aircraft turbofan engine typically has a temperature sensor incorporated in a probe which measure total temperature (TTo) at an inlet of the engine. The total temperature is the temperature of a free stream of air entering the inlet of the engine. The total temperature measurement may be provided to an engine controller and may be used to assist in controlling the engine during operation.

A TTo probe may be prone to icing during operation of an aircraft to which the turbofan engine is mounted. Accordingly, TTo probes may be equipped with heaters for anti-icing purpose. Nevertheless, depending on the position and configuration of the TTo probe, environmental conditions, and power available to heat the probe, ice may still form on the probe under certain circumstances despite being heated. During an icing condition, a sensor associated with the probe may provide inaccurate measurements, and if not corrected this may negatively affect the ability of the engine controller to properly control the engine.

Improvement in engine control during icing of a TTo probe is therefore desirable.

SUMMARY

The disclosure describes systems, devices, and methods for controlling an aircraft turbine engine during an icing condition of a temperature probe.

In various aspects, for example, the disclosure describes systems, devices, and methods for controlling an aircraft turbofan engine during icing of a total temperature (TTo) probe. The methods may be performed by a data processor of a digital engine controller.

Thus, in one aspect, the disclosure describes a method for controlling an aircraft turbofan engine. The method may be performed by a data processor of a digital engine controller and may comprise:

using one or more signals representative of temperature received from a heated temperature probe to generate one or more control signals for use in controlling the engine;

using the same or other signals representative of temperature received from the heated temperature probe, determining that an icing condition associated with the probe exists; and using data representing one or more substitute signals in place of signals representative of temperature received from the heated temperature probe to generate the one or more control signals for use in controlling the engine.

In another aspect, the disclosure describes a method for generating a signal useful in controlling an aircraft engine having an engine controller. The method may comprise:

receiving a first signal representative of a total temperature of inlet air from a heated temperature probe;

using the first signal as a control parameter for generating a second signal useful in controlling the engine;

detecting, based on the first signal, a rise in temperature indicative of an icing condition of the probe;

using a substitute signal as the control parameter for generating the second signal useful in controlling the engine instead of the first signal;

deactivating a heating element associated with the probe; and resuming to using the first signal as the control parameter for generating the second signal useful in controlling the engine.

In a further aspect, the disclosure describes a device useful in controlling an aircraft turbine engine. The device may comprise:

at least one digital processor configured to receive a first signal representative of a total temperature of inlet air using a heated temperature probe and use the first signal as a control parameter to generate a second signal useful in controlling the engine;

memory containing machine-readable instructions for execution by the at least one processor, the machine-readable instructions causing the at least one processor to:

detect, based on the first signal, a rise in temperature indicative of an icing condition of the probe; and use a substitute signal as the control parameter instead of the first signal for producing the second signal useful in controlling the engine.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION OF THE PREFERRED EMBODIMENTS

Various aspects of preferred embodiments are described through reference to the drawings.

Figure 1:
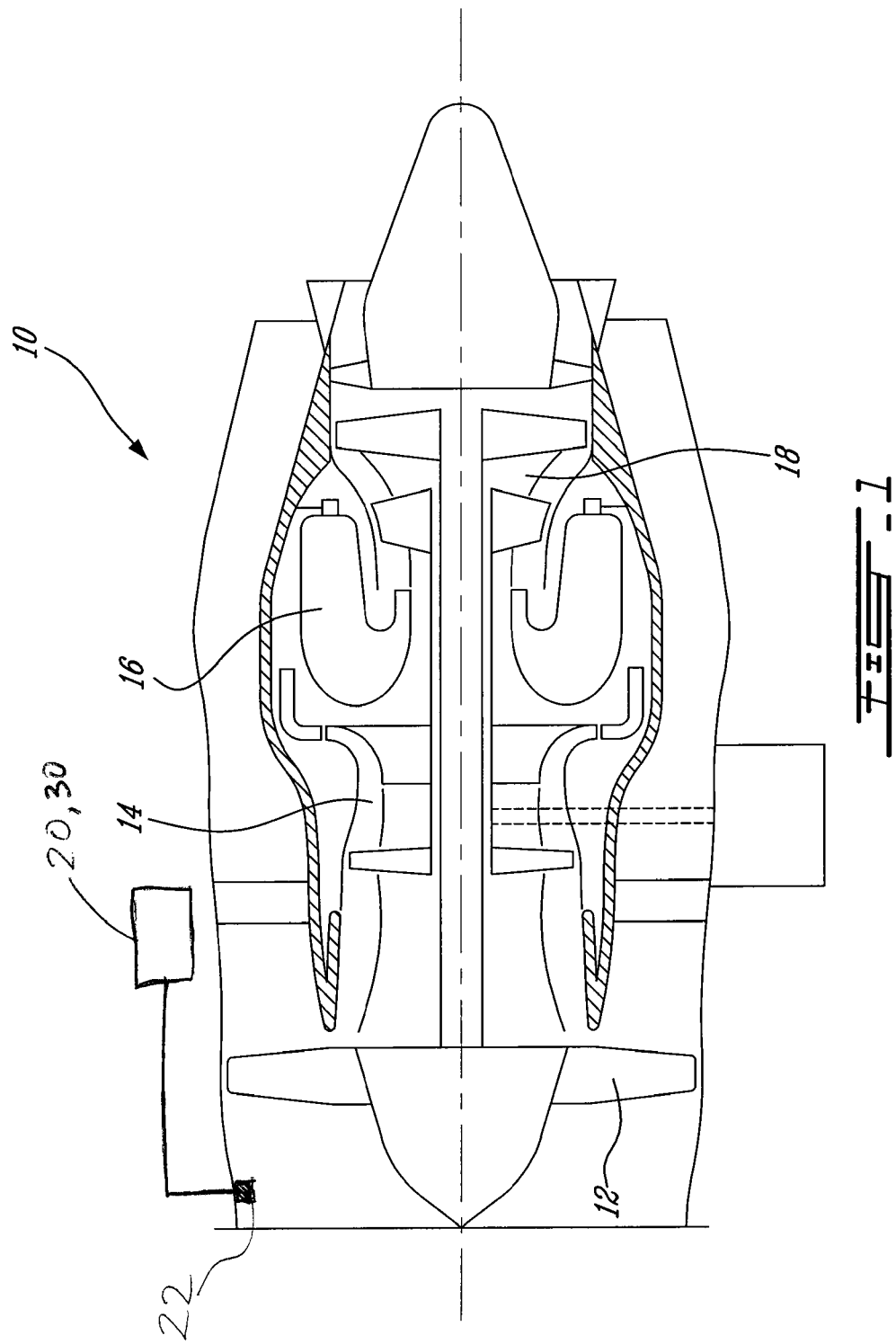
FIG. 1 shows an axial schematic cross-sectional view of a turbofan gas turbine engine having a control device in accordance with the disclosure.

FIG. 1 illustrates schematically a gas turbine engine 10 of a type preferably provided for use in subsonic flight, generally comprising in serial flow communication fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Gas turbine engine 10 may comprise a turbofan engine for use in an aircraft application. Engine 10 may comprise one or more control device(s) 20, 30 which may automatically regulate at least some aspect(s) of operation of engine 10 based on one or more input variable(s). Control device(s) 20, 30 may, for example, be configured to receive multiple input variables representative of current flight conditions including air density, total temperature of inlet air, throttle lever position, engine temperatures, engine pressures, and potentially many other parameters. Accordingly, control device(s) 20, 30 may receive one or more signal(s) from one or more sensor(s) 22 associated with various aspects of the operation of one or more engine(s) 10. Such signals may be received as input(s) by control device(s) 20, 30 and analyzed by one or more automatic data processor(s) according to stored machine-readable instructions. Engine parameters such as fuel flow, stator vane position, bleed valve position, and others may be computed from this data and applied as appropriate by, for example, generating suitably-configured output signals and providing them to relevant device(s) associated with the engine 10.

In various embodiments, control device(s) 20, 30 may include or form part of a Full Authority Digital Engine Control (FADEC) which may, for example, comprise one or more digital computer(s) or other data processors, sometimes referred to as electronic engine controller(s) (EEC) and related accessories that control at least some aspects of performance of engine 10. Control device(s) 20, 30 may for example be configured to make decisions regarding the control of engine 10 until a pilot wishes to or is required to intervene. Control device(s) 20, 30 may be configured to provide optimum engine efficiency for a given flight condition. As data processors, control device(s) 20, 30 may include one or more microcontroller or other suitably programmed or programmable logic circuits.

Figure 2:
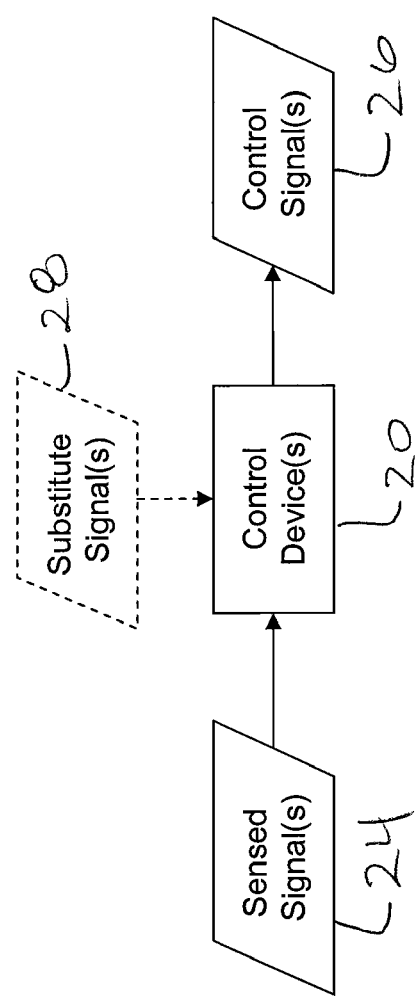
FIGS. 2 and 3 show schematic diagrams of embodiments of control devices in accordance with the disclosure.

FIG. 2 schematically illustrates an exemplary embodiment of control device(s) 20 configured to receive sensed signal(s) 24 and, based on sensed signal(s) 24, generate control signal(s) 26. Sensed signal(s) 24 may originate from sensor(s) 22 associated with one or more engines 10. Sensor(s) 22 may be configured to provide signals representative of one or more measured property(ies) such as, for example, temperature(s), pressure(s), humidity, force(s), relative position(s), motion(s), vibration(s), chemical composition(s) and/or others. Sensor(s) 22 may be configured to provide a signal representative of a total temperature (TTo) of a free stream of air entering an inlet of engine 10. Accordingly, sensor(s) 22 may be disposed near or within an inlet of an engine or engines 10.

Control signal(s) 26 may be useful in controlling at least one aspect of operation of engine(s) 10. For example, control signal(s) 26 may be used to regulate engine operation such as by controlling one or more parameter(s) such as, for example, fuel flow rate, compressor bleed position, stator vane position, bleed valve position, and/or other parameters.

Substitute signal(s) 28 may be used as control parameters by control device(s) 20 instead of sensed signal(s) 24 when it is determined that sensed signal(s) 24 may be inaccurate, unreliable and/or otherwise unsuitable or unavailable. Substitute signal(s) 28 is shown using broken lines to illustrate that it may only be used when needed.

Figure 3:
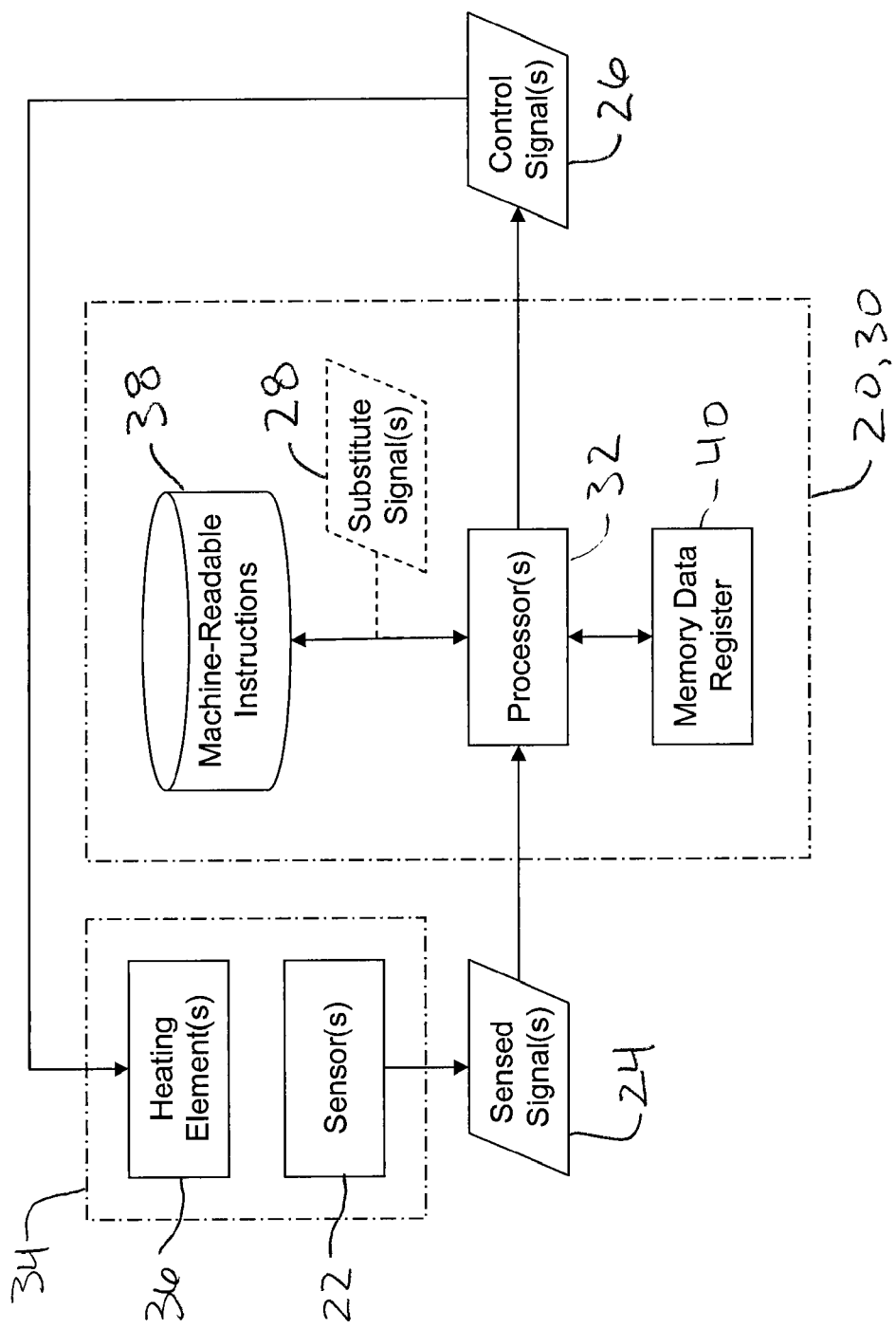

FIG. 3 schematically illustrates control device(s) 30 according to another exemplary embodiment. Control device(s) 20, 30 may comprise processor(s) 32 configured to receive sensed signal(s) 24 and use sensed signal(s) 24 as control parameter(s) to generate control signal(s) 26 useful in controlling the operation of one or more engines 10. For example, processor(s) 32 may comprise one or more digital data processor(s). Sensed signal(s) 24 may be provided by sensor(s) 22 and sensor(s) 22 may be incorporated in one or more probe(s) 34.

Probe(s) 34 may, for example, comprise one or more TTo probe(s) and used to measure total temperature(s) of free streams of ambient air entering one or more engines 10. Such a probe 34 may have an L-shaped body with a forward facing inlet, and one or more resistive temperature devices (RTDs) inside the body for sensing temperature, and one or more transducers for generating corresponding output signals useable by for example, one or more control device(s) 20, 30 in controlling the engine(s) 10.

Probe(s) 34 may be heated for the purpose of preventing substantial ice buildup(s) from forming in, on or around probe(s) 34 and thereby preventing sensed signal(s) 24 from becoming inaccurate or unreliable due to ice buildup(s). Heat may be provided to probe(s) 34 by means of one or more heating element(s) 36 associated with probe(s) 34. Heating element(s) 36 may be electrically powered and/or may be otherwise configured to receive or otherwise provide heat to at least a portion of probe(s) 34 from any suitable source of energy. Heating element(s) 36 may be controlled and/or activated/deactivated based on control signal(s) 26 generated by control device(s) 20,30.

While the disclosure herein is based to some extent on the use of substitute signals in relation to processing TTo signals captured by TTo probes, those skilled in the relevant arts will understand that aspects of the invention have applicability to other types of probes, as for example mentioned herein.

Control device(s) 20, 30 may comprise memory(ies) 38 and memory data devices or register(s) 40. Memory(ies) 38 may comprise any storage means (e.g. devices) suitable for retrievably storing machine-readable instructions executable by processor(s) 32. Memory(ies) 38 may be non-volatile. For example, memory(ies) 38 may include erasable programmable read only memory (EPROM) and/or flash memory. Memory(ies) 38 may contain machine-readable instructions for execution by processor(s) 32. Such machine-readable instructions may cause the digital processor(s) 32 to: detect, based on sensed signal(s) 24, a rise in temperature indicative of an icing condition of heated probe(s) 34; and use substitute signal(s) 28 as the control parameter instead of the sensed signal(s) 24 for producing control signal(s) 26 useful in controlling engine 10.

Memory(ies) 38 may comprise any data storage devices suitable for storing data received and/or generated by processor(s) 32, preferably retrievably. For example, memory(ies) 38 may comprise one or more of any or all of erasable programmable read only memory(ies) (EPROM), flash memory(ies) or other electromagnetic media suitable for storing electronic data signals in volatile or non-volatile, non-transient form.

During operation, depending on the position and configuration/geometry of probe(s) 34, environmental conditions and power available to heat probe(s) 34, ice may form on probe(s) 34 under certain conditions despite being heated. At high altitudes, air temperatures may be well below 0° C. and may be, for example, −20° C. or lower at a typical cruising altitudes for a typical jet aircraft to which engine(s) 10 may be mounted. In some instances, for example, airborne super-cooled water droplets may impact heated probe(s) 34 and solidify to form ice on and/or in probe(s) 34. In smaller aircraft which typically have low voltage (28V) electrical systems, heater element(s) 36 associated with probe(s) 34 may be electrically powered and may not be powerful enough to melt the ice formed by the super-cooled water. Consequently, ice may still form on or inside probe(s) 34 even though heat may be provided to probe(s) 34. When this occurs, sensor(s) 22 (e.g. RTDs, thermocouple(s)) associated with probe(s) 34 may begin to measure the temperature of the ice, rather than the temperature of the ambient air. Hence, at cruising altitudes, for example, sensed signal(s) 24 representative of TTo may become inaccurate and unreliable due to an ice buildup on probe(s) 34. An inaccurate TTo measurement may negatively affect the ability of control device(s) 20, 30 to properly control engine 10.

Figure 4:
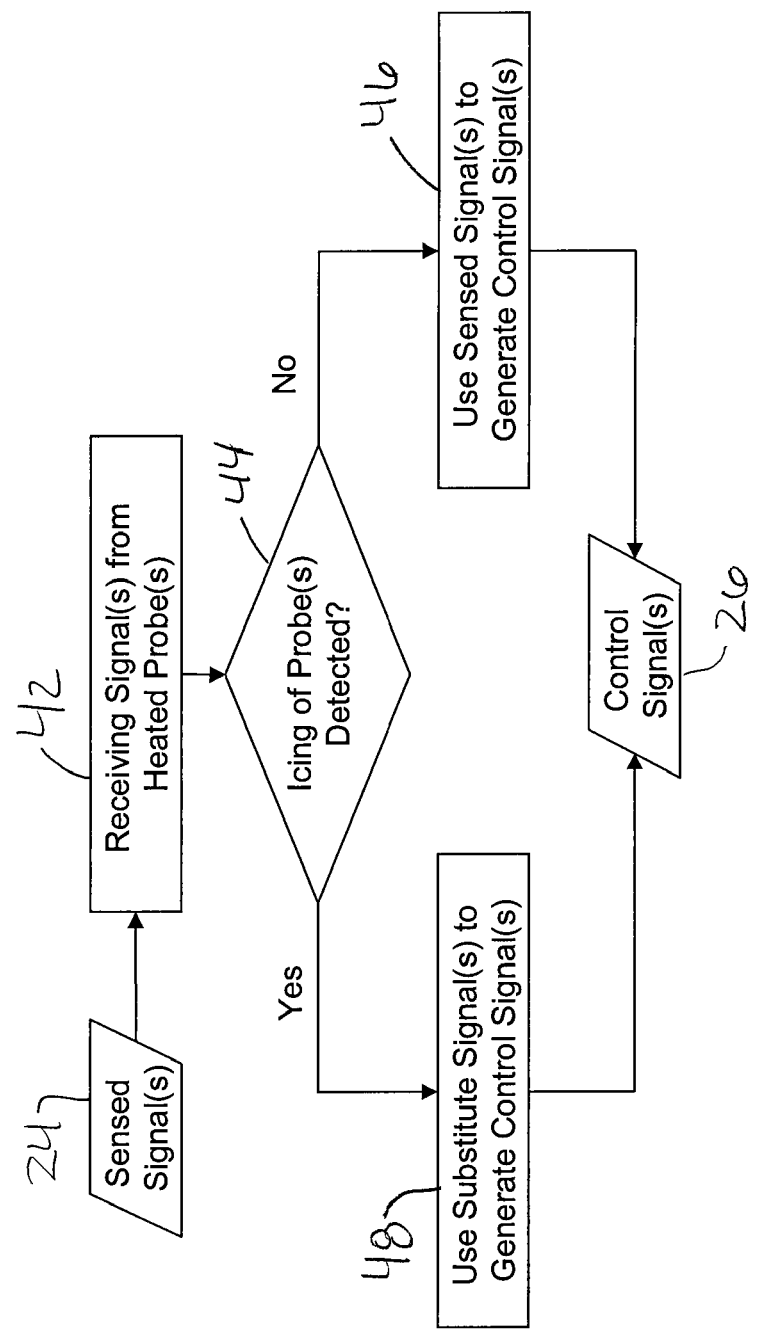
FIGS. 4 and 5 show flow charts illustrating examples of methods for generating control signals in accordance with the disclosure.
Figure 5:
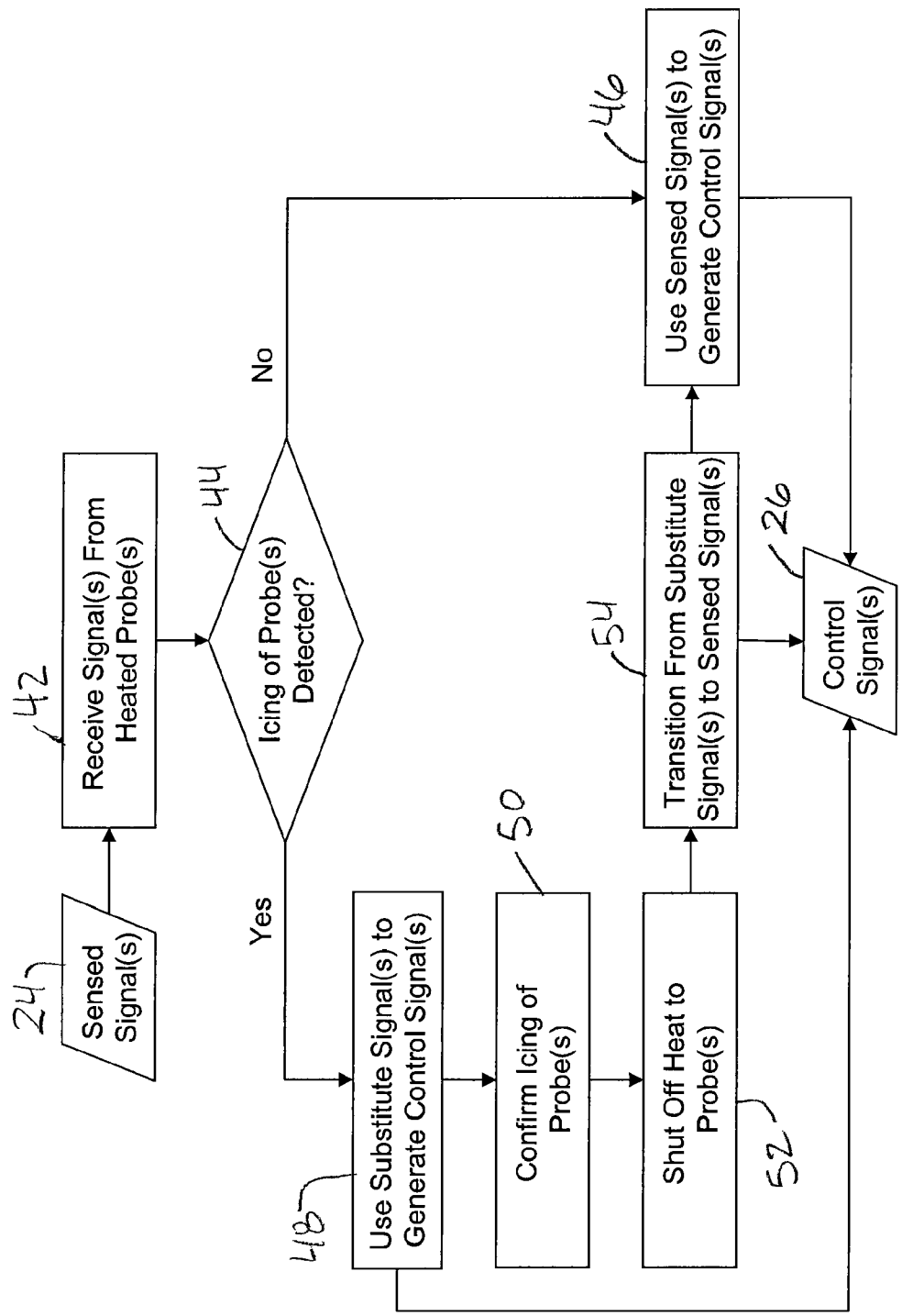

FIGS. 4 and 5 illustrate methods that may be used to reduce the negative effect(s) of an inaccurate TTo measurements caused by an ice buildup. Methods illustrated in FIGS. 4 and 5 may be incorporated in the form of machine-readable instructions for execution by digital processor(s) 32. The machine-readable instructions may be contained in memory(ies) 38 integral and/or external to control device(s) 20, 30.

As previously noted, while the disclosure herein is based to some extent on the use of substitute signals in relation to processing TTo signals captured by TTo probes, those skilled in the relevant arts will understand that aspects of the invention have applicability to other types of probes, as for example mentioned herein.

In reference to FIG. 4, sensed signal(s) 24 from heated probe(s) 34 may be received by processor(s) 32 at step 42. If, as determined at decision 44, sensed signal(s) 24 is not indicative of an icing condition of probe(s) 34 (e.g. it is valid), then sensed signal(s) 24 may be used as a control parameter for controlling engine 10 as shown at step 46. Accordingly, sensed signal(s) 24 may be used basis for generating control signal(s) 26 which may be useful in controlling at least one aspect of engine 10. However, if at decision 44 it is determined that sensed signal(s) 24 is indicative of an icing condition of probe(s) 34, then substitute signal(s) 28 may be used as the control parameter for controlling engine 10 instead of sensed signal(s) 24, as shown at step 48. Accordingly, substitute signal(s) 28 may be used by control device(s) 20, 30 as a basis for generating control signal(s) 26 which may be useful in controlling at least one aspect of engine 10.

In reference to FIG. 5, sensed signal(s) 24 representing temperature(s) generated by heated probe(s) 34 may be received by processor(s) 32 of control device(s) 20, 30 at step 42. If, as determined at decision 44, sensed signal(s) 24 is/are not indicative of an icing condition of probe(s) 34 (e.g. they are valid), then sensed signal(s) 24 may be used as the control parameter for controlling engine 10 as shown at step 46. Accordingly, sensed signal(s) 24 may be generated by processor(s) 32 using stored instructions representing suitable algorithms, stored for example in memory(ies) 38, and/or pre-determined substitute values may be retrieved from memory(ies) 40, using table look-up or other processes implemented using processor(s) 32.

At 48, such generated or retrieved substitute signals may be used as bases for generating control signal(s) 26 which may be useful in controlling at least one aspect operation(s) of engines 10. If, for example, at decision 44 it is determined that sensed signal(s) 24 is indicative of an icing condition of probe(s) 34, then substitute signal(s) 28 may be used as control parameters for controlling engine 10 instead of sensed signal(s) 24, as shown at step 48. Accordingly, substitute signal(s) 28 may be used by control device(s) 20, 30 as a basis for generating control signal(s) 26 which may be useful in controlling at least one aspect of engine 10 similarly to the method of FIG. 4.

Substitute signal(s) 28 may be used on a temporary basis until one or more corrective action(s) has (have) been taken, or a prevailing condition has abated (e.g., a corresponding TTo sensor has thawed sufficiently to provide valid TTo data signals) and the use of sensed signal(s) 24 can be resumed. Substitute signal(s) 28 may be substantially equivalent (e.g. of equivalent magnitude and/or representative of substantially the same temperature) to sensed signal(s) 24 which was (were) received at or prior to the detection of the icing condition of probe(s) 34. For example, substitute signal(s) 28 may be substantially equivalent to the last sensed signal(s) 24 measured prior to the detection of the icing condition. For example, substitute signal(s) 28 may include one or more synthesized signal(s) indicative of one or more substitute temperature(s). Such substitute temperature(s) may be substantially equivalent to or otherwise representative of temperature(s) represented by sensed signal(s) 24 which was (were) received at or prior to the detection of the icing condition of probe(s) 34. Substitute signal(s) 28 may be held at a substantially constant magnitude (e.g. substitute temperature) until it is determined that the use of sensed signal(s) 24 can be resumed.

Trigger conditions to be evaluated at 44 for use of substitute signals at 48 may be of any type suitable in the relevant circumstances. For example, at decision 44 an icing condition of probe(s) 34 may be detected by an unusual temperature rise as represented by sensed signal(s) 24. Such temperature rise may be indicative of sensor(s) 22 measuring the temperature of an ice buildup inside probe(s) 34 instead of the ambient air while probe(s) 34 continues to be heated by heating element(s) 36. For example, the temperature rise may include the temperature attaining a threshold temperature and/or may include the temperature rising at or exceeding a threshold rate.

As shown in FIG. 5, once an icing condition is detected or suspected, a confirmation process may be implemented at step 50, in which the icing or other substitute trigger condition may be confirmed while probe(s) 34 may continue to be heated. During such confirmation period, sensed signal(s) 24 may continue to be monitored to determine whether the sensed temperature represented by sensed signal(s) 24 confirm an icing condition of probe(s) 34. Confirmation of an icing condition may for example include a further temperature rise as determined from sensed signal(s) 24 following the detection of the icing condition followed by a leveling off of the sensed temperature from probe(s) 34. The leveling off (e.g. stabilization) of the sensed temperature may, for example, occur relatively close to or at about the freezing mark (e.g. 0° C.).

Once a substitution trigger condition has been confirmed, corrective action may be taken. For example, when an icing condition has been confirmed, corrective action(s) may include shutting off heat to probe(s) 34 as shown at step 52. For example, this may include deactivating heating element(s) 36 of probe(s) 34 using one or more of control signal(s) 26 generated by processor(s) 32.

After deactivation of heating element(s) 36 of probe(s) 34, the sensed temperature from probe(s) 34 may begin to decrease and eventually stabilize to a value substantially close to or approximating the actual temperature. Even though probe(s) 34 may be subject to an icing condition, sensed signal(s) 24 may be representative of a temperature which is close enough to the actual temperature so that the use of sensed signal(s) 24 may be resumed. The difference between the temperature from sensed signal(s) 24 and the actual temperature may be such that it does not significantly affect the control of engine 10. Accordingly, following the confirmation period, a transition period may take place at step 54 during which a value (e.g. magnitude) of substitute signal(s) 28 may be varied to transition to or relatively near a value (e.g. magnitude) of sensed signal(s) 24. The transition period may comprise a gradual change in value of substitute signal(s) 28 towards the value of sensed signal(s) 24. The gradual change may have a linear over a desired period of time or have any other suitable profile. Following the transition period, the use of sensed signal(s) 24 as the control parameter for controlling engine 10 may be resumed. An objective of the transition period may be to avoid an excessively large difference in values (e.g. magnitudes) between substitute signal(s) 28 and sensed signal(s) 24 when the use of sensed signal(s) 24 is resumed. For example, the transition period may provide a substantially seamless transition when changing from using substitute signal(s) 28 to using sensed signal(s) 24. The transition period may be selected so that no sudden change in the operation of engine 10 is encountered when changing from the use of substitute signal(s) 28 to sensed signal(s) 24.

Figure 6:
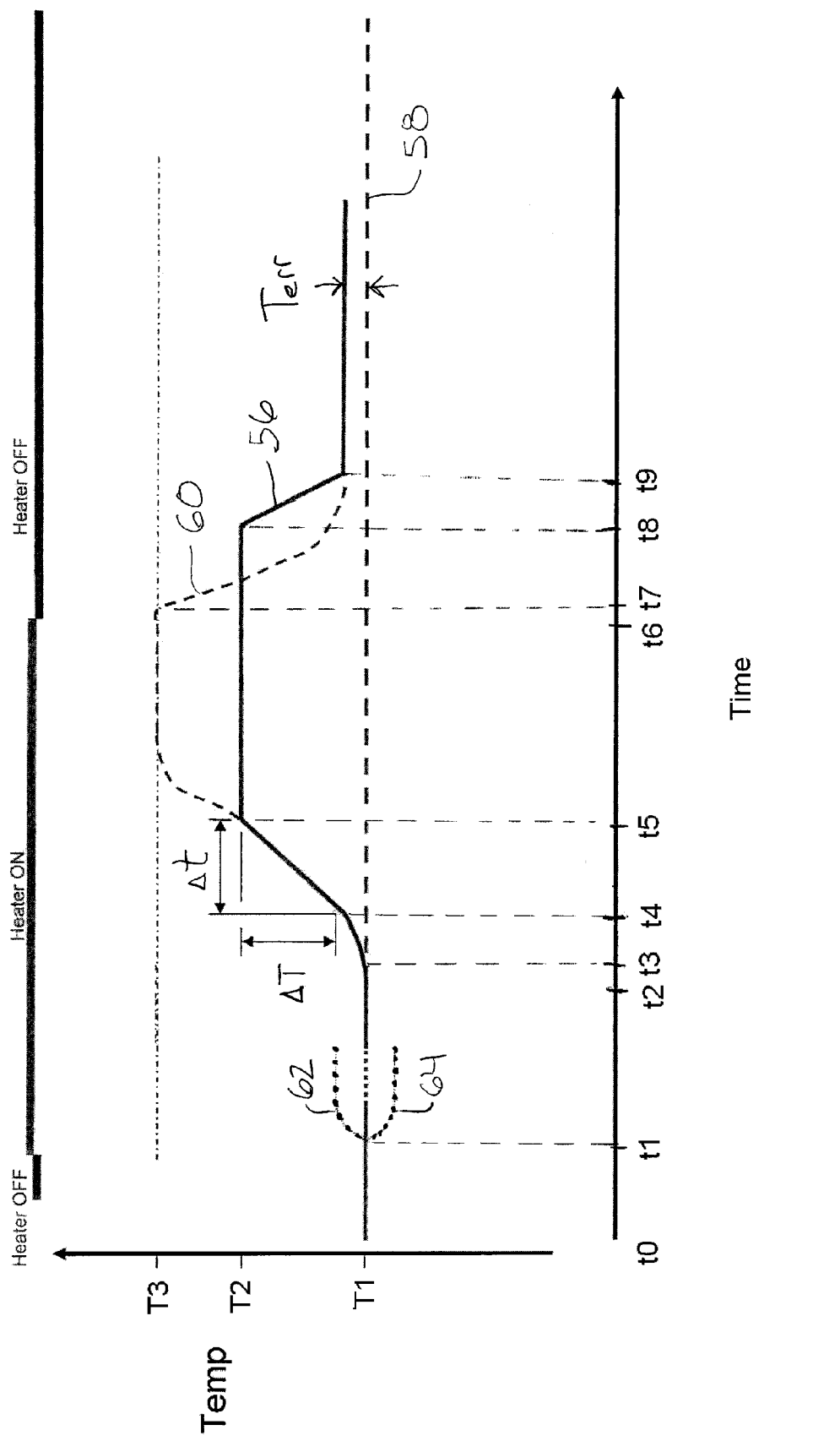
FIG. 6 shows an exemplary graphical representation of relationships between an actual temperature, a sensed temperature and a substitute temperature during an icing condition of a probe.

FIG. 6 shows an exemplary graphical representation of relationships between an actual operating parameter 58 (in this case temperature T1), a sensed parameter (temperature TTo) 60 based on sensed signal(s) 24, and a substitute signal 56 representing a parameter (substitute temperature TTo) utilized for the control of an engine 10 during a triggering condition causing the sensed parameter 60 to inadequately represent the actual parameter 58 (for example, an icing condition of probe(s) 34. In the example shown, a temperature utilized by control device(s) 20, 30 as the control parameter may be represented by line 56. The actual total temperature of the free stream of air entering engine 10 may be represented by line 58 and remain substantially constant at T1 during the particular time period shown in FIG. 6. T1 may be around −20° C., for example. The sensed temperature is represented by line 60 and may superimpose line 56 at times prior to t5 and after t9 as shown in FIG. 6.

As will be understood by those skilled in the relevant arts, substitute parameter(s) 56 may be variable parameters generated using algorithms representing actual, estimate, or ideal operating parameters; fixed parameters used as approximations of any or all of such actual, estimated, or ideal parameters; and/or predefined values or ranges of values stored in databases such as data sets useful in the implementation of automated table look-up schemes. Any algorithms, schemes, or procedures configured for providing suitable substitute operating parameters 56 will serve.

For example, in the TTo example shown in FIG. 6, between times t0 and t1 heating element(s) 36 of probe(s) 34 may be deactivated in an event where no icing condition is expected to occur. Accordingly, sensed temperature 60 from sensed signal(s) 24 may be representative of the actual temperature 58, T1 and may be utilized as the control parameter for controlling engine 10. At time t1 for example, heating element(s) 36 associated with probe(s) 34 may be activated in anticipation of a potential icing condition. Heating element(s) 36 may be manually activated by an operator of an aircraft such as a pilot or automatically activated by a system associated with engine 10 and/or an aircraft to which engine 10 is mounted. For example, the activation of heating element(s) 36 may be controlled by control device(s) 20, 30. Upon activation of heating element(s) 36, the sensed temperature 60 may need to be adjusted (e.g. compensated) in order to take into account an erroneous rise in temperature introduced by the activation of heating element(s) 36. Line 62 in FIG. 6 shows an exemplary theoretical temperature rise associated with the activation of heating element(s) 36 and line 64 shows a corresponding correction that may be applied to compensate for the activation of heating element(s) 36. Such compensation and/or adjustment made to sensed temperature 60 may be determined empirically according to known or other methods.

Between times t1 and t2, heating element(s) 36 may adequately prevent icing of probe(s) 34 and therefore the compensated sensed temperature 60 may continue to represent the actual total temperature 58, T1 and continue to be used as the control parameter.

However, in some instances and as represented at time t2 for example, airborne super-cooled water droplets may impact heated probe(s) 34 and then solidify to form ice on and/or inside probe(s) 34. As explained above, depending on the specific configuration, positioning of probe(s) 34 and heating capacity of heating element(s) 36, icing of probe(s) 34 may still occur under the right circumstances despite heat being applied to probe(s) 34. For example, in smaller aircraft which typically have low voltage (28V) electrical systems, heating element(s) 36 may not be powerful enough to melt ice formed by super-cooled water, and thus ice may still form inside the probe(s) 34. When this occurs, sensor(s) 22 (e.g. RTDs temperature sensor(s)) may begin to measure the temperature of the ice buildup instead of the total temperature of the ambient air. At cruising altitudes for example, the temperature represented by sensed signal(s) 24 may begin to rise relative to T1 as shown at t3 and stabilize to about T3 at some time after t5 when the sensed temperature 60 is that of an ice buildup while probe(s) 34 continues to be heated. For example, temperature T3 may be around 0° C. Hence, during an icing condition of probe(s) 34, the sensed temperature 60 may be inaccurate and may negatively affect the ability of control device(s) 20, 30 to properly control engine 10.

It has been empirically found that, for specific installation geometries of probe(s) 34, a typical sensed temperature 60 may tend to rise linearly over at least a portion of the rise from the actual temperature T1 (e.g. proper functioning of probe(s) 34) to a higher "false" temperature T3 (e.g. iced probe(s) 34) during an icing condition. See lines 60 and 56 between times t4 and t5 in FIG. 6. An expected temperature rise that is indicative of an icing condition may be determined empirically by conducting suitable testing, or may be determined or predicted in any other suitable manner. The expected temperature rise may include the sensed temperature 60 attaining a threshold temperature and/or rising at or exceeding a threshold rate. In reference to FIG. 6 for example, an icing condition may be detected based on the sensed temperature 60 rising by an amount $\Delta T$ over a period of time $\Delta t$ (e.g. t5-t4) and thereby equal or exceed a threshold rate and be indicative of an icing condition of probe(s) 34. The temperature rise may be linear with respect to time or of another detectable profile.

Machine-readable instructions (e.g. software), resident for example in memory(ies) 38 associated with control device(s) 20, 30 may be employed in monitoring sensed temperature 60 for a temperature rise at the threshold rate (e.g. $\Delta T/\Delta t$). An exemplary temperature rise indicative of an icing condition may include a temperature rise of 10° C. over a period of 10 seconds. Once a temperature rise at or exceeding the threshold rate is determined to have occurred, it may be determined that a probe icing event has occurred and thus a suitable corrective action(s) may be carried out. An example corrective action may be for control device(s) 20, 30 executed coded instruction sets configured to cause use of substitute signal(s) 28 as the control parameter instead of sensed signal(s) 24. Substitute signal(s) 28 may for example comprise a synthesized signal representative of a constant temperature prior to the detection of the icing condition. For example, substitute signal(s) 28 may be held substantially constant between t5 and t8 and be representative of temperature T2 at which the icing condition was initially identified at time t5. In the present example, temperature T2 may be around −10° C. Alternatively, a variable temperature reflective of known or estimated actual conditions may be used, through execution of suitably-configured algorithms.

The initial detection of an icing condition may be followed by a confirmation period during which substitute signal(s) 28 may continue to be used by control device(s) 20, 30 while it is confirmed that an icing condition of probe(s) 34 has occurred or is occurring. The confirmation period may include the temperature represented by sensed signal(s) 24 continuing to rise to temperature T3 (e.g. 0° C.) and remaining substantially constant thereafter. FIG. 6 shows sensed temperature 60 rising to T3 and remaining substantially constant between t5 and t6. Other suitable confirmation indicators may also be used instead of, or in conjunction with, the above example.

Once an icing condition of probe(s) 34 has been confirmed, heating element(s) 36 may be deactivated. Control device 20, 30 may instruct heating element(s) 36 to be turned off at t7, for example, by generating appropriate control signal(s) 26 that may be used to control the activation of heating element(s) 36. Once heating has ceased, the relatively cooler ambient air may cause the temperature of probe(s) 34 and ice build-up to drop. The ice build-up may become super-cooled and consequently cause the sensed temperature 60 to also drop as shown between t7 and t9. At t9 the sensed temperature may stabilize to a temperature which approximates the actual temperature 58, T1. As shown in FIG. 6, sensed temperature 60 may stabilize at a value slightly above the actual temperature T1. The difference between the sensed temperature 60 and the actual temperature 58, T1 after t9 is identified as Terr. Terr may be sufficiently small so that the use of sensed signal(s) 24 by control device(s) 20, 30 may be resumed without significantly affecting the operation of engine 10 even though probe(s) 34 may be iced and heating element(s) 36 may be turned off. The stabilized, heater-off sensed temperature 60 may be referred as an "iced" temperature. During such iced condition, sensed temperature 60 may essentially represent the temperature of the ice formed on probe(s) 34. The ice formed on probe(s) 34 may become super-cooled to substantially approximate the actual ambient air total temperature 58, T1 which the un-iced probe(s) 34 was intended to measure in the first place.

In order for control device(s) 20, 30 to resume using sensed signal(s) 24 as the control parameter for controlling engine 10, substitute signal(s) 28 may be varied to transition to or relatively near a value (e.g. magnitude) of sensed signal(s) 24 during a transition period. The transition period may comprise a gradual change in value of substitute signal(s) 28 towards the value of sensed signal(s) 24 as represented by line 56 between t8 and t9. A beginning of the transition period t8 may be based on a prediction of the occurrence of stabilization of sensed temperature 60 at or near actual temperature 58, T1 (e.g. within Terr of T1). Accordingly, the beginning of the transition period may take place before the stabilization of sensed temperature 60 has actually taken place based on the prediction. The prediction of the stabilization of sensed temperature 60 may be based on empirical data and/or may be based on a rate at which sensed temperature 60 may drop following the de-activation of heating element(s) 36. FIG. 6 shows a linear transition of substitute signal(s) 28 from T2 to sensed temperature 60 between t8 and t9 but it is understood that other transition profiles may also be suitable.

Following the transition period, sensed signal(s) 24 may thereafter be used by control device 20, 30 while heating element(s) 36 may remain inactive until such time when engine 10 encounters conditions which may cause the ice build-up in or on probe(s) 34 to melt. Otherwise, temperature fluctuations and/or other changes causing sensed signal(s) 24 to vary and/or remain below a pre-determined threshold temperature and/or rate may be ignored while sensed signal(s) 24 is (are) used as the control parameter by control device(s) 20, 30 while generating control signal(s) 26.

The above description is meant to be exemplary only, and one skilled in the art will recognize that changes may be made to embodiments described herein without departing from the scope of the invention disclosed. For example, the devices, systems and methods described herein may be used on any suitable aircraft engine comprising a suitable probe configuration. Also, probe(s) 34 may comprise two or more RTDs (and/or other suitable types of sensor(s)) configured in a dual-channel redundancy system for example. Still other modifications which fall within the scope of the present invention will be apparent to those skilled in the art, in light of a review of this disclosure, and such modifications are intended to fall within the appended claims.

Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims.

What is claimed is:

1. A method for controlling an aircraft turbofan engine, the method performed by a data processor of a digital engine controller and comprising:
   receiving a signal representative of temperature received from a heated temperature probe and using the received signal to control the engine;
   based on the signal representative of temperature received from the heated temperature probe, determining that an icing condition associated with the probe exists;
   using data representing a substitute temperature instead of the signal representative of temperature received from the heated temperature probe to control the engine;
   deactivating a heating element associated with the probe following the determination of the icing condition; and
   with the heating element deactivated, resuming to use the signal representative of temperature received from the temperature probe to control the engine instead of the data representing the substitute temperature.

2. The method as defined in claim 1, wherein the determining that the icing condition exists is based at least partly on a rise in temperature at the heated temperature probe.

3. The method as defined in claim 2, wherein the rise in temperature includes the temperature rising at or exceeding a threshold rate.

4. The method as defined in claim 2, wherein the rise in temperature includes the temperature increasing by a threshold amount at or exceeding a threshold rate.

5. The method as defined in claim 1, wherein the substitute temperature comprises a temperature at or prior to the determination of the icing condition.

6. The method as defined in claim 1, wherein the deactivating of the heating element occurs after a confirmation process in which the temperature associated with the heated temperature probe is determined to have stabilized at a temperature higher than an actual temperature.

7. The method as defined in claim 1, wherein resuming to use the signal representative of temperature received from the temperature probe to control the engine with the heating element deactivated follows a determination that the temperature of the temperature probe has reached at a temperature approximating an actual temperature.

8. The method as defined in claim 7, comprising transitioning a magnitude of the substitute temperature towards a magnitude of the temperature received from the temperature probe.

9. A device useful in controlling an aircraft turbine engine, the device comprising:
- at least one digital processor configured to receive a first signal representative of a total temperature of inlet air using a heated temperature probe and use the first signal as a control parameter to generate a second signal useful in controlling the engine;
- memory containing machine-readable instructions for execution by the at least one processor, the machine-readable instructions causing the at least one processor to:
  - detect, based on the first signal, an icing condition of the probe;
  - use a substitute signal representing a substitute temperature as the control parameter instead of the first signal for producing the second signal useful in controlling the engine;
  - cause deactivation of a heating element associated with the probe following the detection of the icing condition; and
  - cause the at least one digital processor to resume the use of the first signal as the control parameter for producing the second signal useful in controlling the engine after the deactivation of the heating element.

10. The device as defined in claim 9, wherein the substitute signal is representative of the temperature from the first signal at or prior to a rise in temperature indicative of the icing condition.

11. The device as defined in claim 9, wherein the determining of the icing condition is based on a rise in temperature at the probe.

12. The device as defined in claim 11, wherein the rise in temperature includes the temperature rising at or exceeding a threshold rate.

13. The device as defined in claim 11, wherein the rise in temperature includes the temperature increasing by a threshold amount at or exceeding a threshold rate.

14. The device as defined in claim 9, wherein causing to deactivate the heating element occurs after a confirmation process in which the temperature associated with the probe is determined to have stabilized at a temperature higher than an actual temperature.

15. The device as defined in claim 9, wherein causing to resume the use of the first signal as the control parameter for producing the second signal useful in controlling the engine after the deactivation of the heating element follows a determination that the temperature of the probe has reached a temperature approximating an actual temperature.

16. The device as defined in claim 9, wherein the machine-readable instructions are configured to cause the at least one processor to transition a magnitude of the substitute signal towards a magnitude of the first signal before resuming the use of the first signal as the control parameter.

* * * * *